Dec. 9, 1947.  H. B. HOLTHOUSE  2,432,314
GASOLINE BURNING HOT AIR HEATER
Filed Aug. 30, 1941  3 Sheets-Sheet 3

Inventor:
Harry B. Holthouse
By Foorman L. Mueller
Atty.

Patented Dec. 9, 1947

2,432,314

UNITED STATES PATENT OFFICE 2,432,314

GASOLINE BURNING HOT-AIR HEATER

Harry B. Holthouse, Chicago, Ill., assignor to Motorola, Inc., a corporation of Illinois Application August 30, 1941, Serial No. 408,983

8 Claims. (Cl. 126—110)

1

This invention relates generally to heating devices and in particular to a heating device of internal combustion type for a mobile craft. This application is a continuation in part of co-pending application Serial No. 333,971, filed May 8, 1940, now Patent No. 2,286,855, issued June 16, 1942.

The mobile craft heaters of internal combustion type in the prior art are generally of two classes, namely suction and pressure heaters. In these heaters a relatively high pressure air supply is usually required to provide for an atomizing of the fuel for mixing it with the air. This high pressure air is generally obtained by utilizing a portion of the engine power to drive a fan or blower for the pressure type heaters, or by a connection with the engine intake manifold for the suction type heaters. These heaters, therefore, are dependent for their operation upon a concurrent operation of the craft engine and are thus directly responsive in operation to engine operating conditions. Because of the great variation in the rate at which air is supplied to the heater by the craft engine burning of the mixture in the heater is erratic and very unstable. Thus for instance, in the suction heater more fuel is drawn into the combustion chamber for burning during light load engine operation than under heavy load operation. In the event a period of light engine operation is followed by a period of heavy load operation the light load fuel charge is starved because of an insufficient amount of air being supplied to the combustion chamber during the period of heavy load engine operation. In some cases combustion may be completely stopped by a too sudden change in the quantity of air and fuel admitted to the combustion chamber. This disadvantage has been overcome in part by the use of various control mechanisms which have been devised in efforts to provide for a substantially uniform rate of air flow through the combustion chamber of the heater. These efforts, however, have failed generally to satisfactorily eliminate the effects of engine operation on the heater.

Further in these prior art mobile craft heaters, the combustion mixture is moved through the combustion chamber by the application of a variable pressure at one end of the combustion chamber. Thus the mixture farthest away from the pressure producing means is less readily moved than the mixture close to such means. With a variable pressure producing the mixture flow the mixture tends to move in waves rather than in a continuous steady flow so that burning

2 proceeds at a highly variable rate. Also in the event of an increase of the back pressure in the combustion chamber the back pressure is reduced to a normal operating value only by the action of a counterpressure at one end of the combustion chamber. Since the counterpressure is highly variable, this increased back pressure may be of relatively long duration so as to appreciably effect the satisfactory operation of the heater.

It is an object of this invention, therefore, to provide an improved heater of internal combustion type for a mobile craft.

Another object of this invention is to provide an improved heater of internal combustion type for a mobile craft which is operable independently of the craft engine and entirely on the battery utilized with the craft engine.

A further object of this invention is to provide a heating device of internal combustion type for a mobile craft in which the fuel and air mixture is moved at a substantially uniform rate throughout the entire length of the combustion chamber at all times of heater operation.

It is another object of this invention to provide an internal combustion heater of low pressure type for a mobile craft which is adapted for flexibility in construction by the substantial elimination of critical back pressures in the combustion chamber.

Another object of this invention is to provide a heater of internal combustion type for a mobile craft which is compact and simple in design, operates quietly and efficiently with a minimum of power, and is completely automatic in operation to provide for a substantially steady burning of the combustible mixture in the combustion chamber.

A particular feature of this invention is found in the provision of the low pressure battery-operated heater of internal combustion type for a mobile craft in which the air and fuel for burning in the combustion chamber are mixed together by vaporizing the fuel, with the mixture being carried through the combustion chamber at a substantially uniform and continuous rate of speed by the cooperating action of pressure means at the inlet of the combustion chamber and suction means at the outlet thereof.

Another feature of this invention is found in the provision of a heating device operable at low pressures in which the combustion chamber is of elongated length and provided with pressure means at the inlet and suction means at the outlet thereof which cooperate to maintain a substantially uniform and continuous flow of the combustible mixture throughout the entire length thereof.

An advantage of this invention is found in the provision of a low pressure heating device in which a portion of the air supplied for combustion is utilized in providing a suction pressure at the outlet of the combustion chamber to provide for a uniform flow of the combustible mixture through the combustion chamber.

Further objects, features, and advantages of this invention will be apparent from the following description when taken in connection with the accompanying drawing in which.

In the practice of this invention the heater is operated independently of the craft engine and entirely by the power from the craft battery. In applying the heater to an automobile in particular, it is contemplated that the heater operating motor be of a size to operate on a current which is far below the average amperage rating of the usual car battery and well within all practical factors of safety for the heater current consumption. Motors adapted to be thus operated have been found to produce an operating air pressure of about ⅛" to 3" of water. Heaters in the prior art have been operated on pressures as low as 4" to 10" of water but it is readily apparent that this pressure is about 16 to 40 times greater than the pressure which may be employed in the heater of this invention. A pressure of 4" of water is thus relatively high and would require a motor which would be too large for commercial and practical application in a battery-operated car heater. Since fuel, of course, cannot be properly atomized by air pressures of the order of several inches of water, air and fuel mixed at these pressures form what is commonly referred to as a "wet mixture." Before this "wet mixture" can be efficiently burned it must be completely broken up and intimately mixed prior to ignition. The invention, therefore, contemplates the provision of means for effecting a complete mixing of the air and fuel at low pressure, by vaporizing the fuel, with both suction and pressure means being utilized for continuously moving the mixture at a substantially uniform rate of speed through the combustion chamber.

Figure 1:
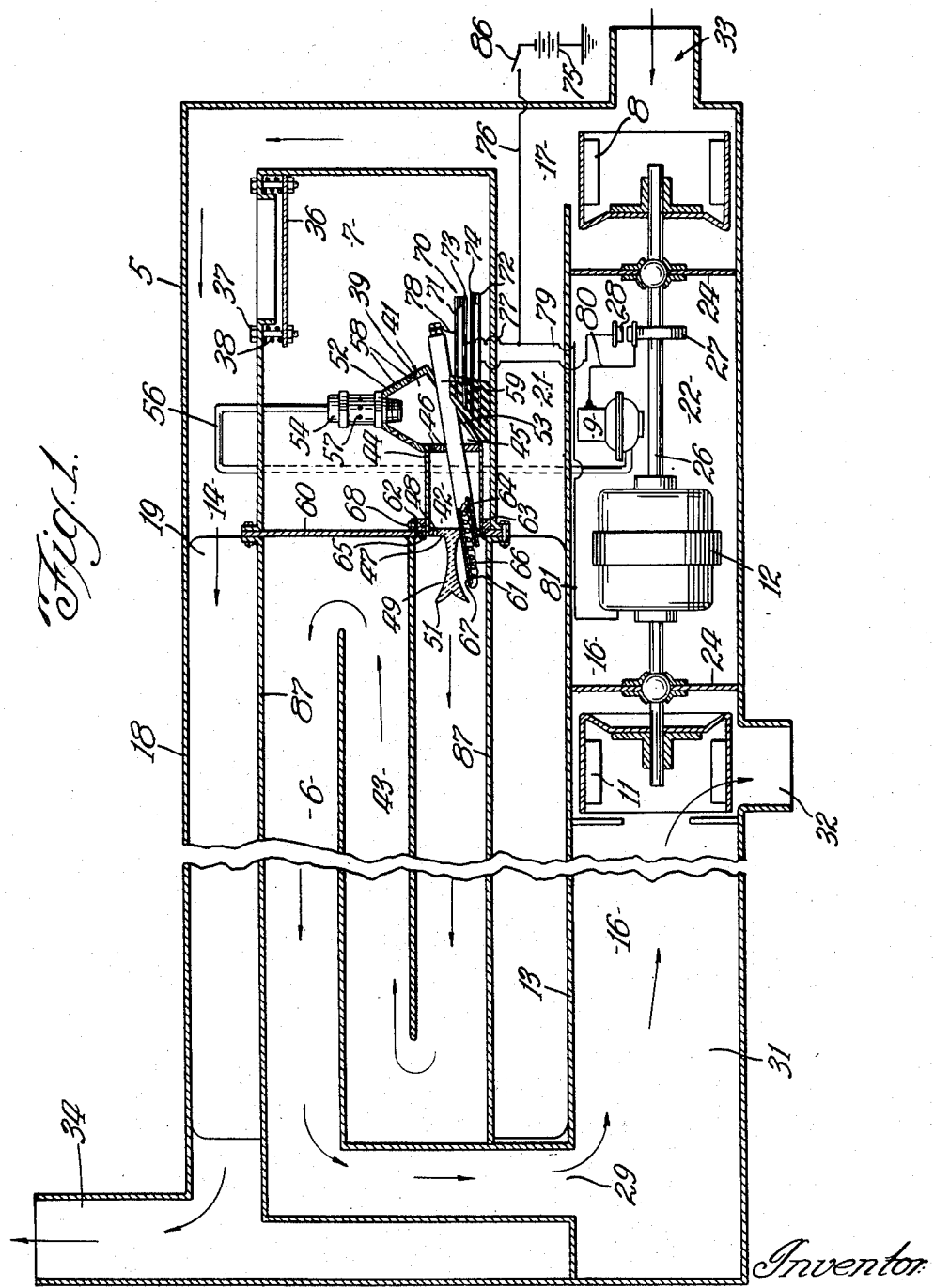
Fig. 1 is a diagrammatic illustration of one embodiment of the invention.

With reference to the drawings there is shown in Fig. 1 a heater comprised of a housing structure 5, a combustion chamber 6, an air supply chamber 7, an air supply fan 8, a fuel pump 9, a suction fan 11, and a motor 12; the motor 12 being common to the operation of the fans 8 and 11 and fuel pump 9. The housing structure 5 is provided with a partition wall 13 to form an upper compartment 14 and a lower compartment 16, the compartments 14 and 16 being in communication with each other through a passage 17. The combustion chamber 6 and air supply chamber 7 are of substantially cylindrical form and longitudinally arranged in the compartment 14; the chambers 6 and 7 being spaced away from the housing walls 13 and 18 by fins 19 radially extended from the combustion chamber to provide an annular passage 21 about the combustion and air supply chambers.

The fans 8 and 11, fuel pump 9 and motor 12 are positioned in the lower compartment 16, the motor 12 being in a compartment 22 which is separated from the fans 8 and 11 by partition walls 24. The motor shaft 26 is rotatably supported in the walls 24, and has the fans 8 and 11 mounted at the opposite ends thereof. The fuel pump 9 is located in the motor compartment 22 and is illustrated as being of solenoid actuated type and operated by the motor 12 through a cam 27 and a breaker assembly 28. It is to be understood, however, that a bellows or diaphragm pump mechanically actuated by a cam (not shown) on the motor shaft 26 may be used in place of the solenoid pump 9. The fan 11 is arranged relative to the outlet 29 of the combustion chamber 6 so as to draw the mixture therefrom into a passage 31 for discharge from the heater through the outlet opening 32. The fan 8 draws air into the heater through inlet opening 33 for circulation through the passage 17 and heated passage 21; the air being discharged from the heater through the outlet opening 34. The inlet 33 may be connected with either the inside or outside of the mobile craft passenger compartment (not shown) while the outlet 34 is connected to direct the heated air into the passenger compartment. Air for combustion enters the air supply chamber 7 from the air passage 17 through a valve 36. The valve 36 is illustrated as of flat disc type; supported from the top wall of the chamber 7 by screws or the like 37 and is held in a normally open position in an obvious manner, by springs 38 which are positioned about the screws 37. It is to be understood that the valve 36 may be satisfactorily located in any one of the walls of the chamber 7 adjacent the passage 17 or 21 and that a poppet valve may be used in place of the disc valve shown. The air from the chamber 7 is mixed with the fuel for burning in the combustion chamber 6 in a fuel conditioning unit 41 which will now be fully described.

The conditioning unit or fuel vaporizing means 41 is located within the air chamber 7 at the inlet of the passage 43 in the combustion chamber 6 and includes an air and fuel mixing chamber 39 and an equalizing chamber 42 which is arranged between the inlet of the combustion chamber and the mixing chamber 39. The equalizing chamber 42 is separated from the mixing chamber 39 by a partition or baffle plate 44 which is provided in a heat conducting metal such as copper. Communication between the chambers 39 and 42 is through apertures 46 formed in the partition member 44. The equalizing chamber 42 is separated from the combustion chamber 6, and specifically from the passage 43 therein, by a partition plate 47 which is provided in a suitable heat insulating material. The partition 47 near the peripheral edge thereof is formed with apertures 48 to provide space communication between the chamber 42 and the combustion chamber passage 43. The central portion of the partition 47 is imperforate and is formed with an extension 49 which extends longitudinally therefrom into the combustion passage 43. The outer or free end of the extension 49 has radially extending prongs or fingers 51 thereon which attain a red glow during operation of the heater to function as igniter elements.

The mixing chamber 39 is positioned at a closed end of the unit 41 and includes a cone-shaped wall portion 52 and an inclined wall portion 53 which is oppositely disposed from the cone portion 52. Fuel is admitted into the mixing chamber 39 through an injection nozzle 54, which is mounted in the apex of the cone portion 52 and is connected to the fuel pump 9 through a supply line 56. The nozzle 54 is formed with apertures 57 for admitting a portion of the supply air from the chamber 7 into the fuel stream prior to its admission into the mixing chamber 39. Another portion of air from the supply chamber 7 is admitted into the mixing chamber through air ports 58 which are formed in the cone portion 52. The arrangement of the nozzle 54 across from the wall 53 provides for the air and fuel mixture from the nozzle 54 and ports 58 being impinged upon the heating portion of a combination heating and igniting element or heat gun 59 which extends longitudinally of the conditioning unit 41, the heating portion being disposed in the chamber 39 and the igniting portion 61 projecting into the combustion passage 43. A further portion of air from the air supply chamber 7 is admitted into the combustion passage 43 through apertures 62 which extend through a holding collar 63 and combustion chamber wall 60. The collar 63 is mounted about the unit 41 at the chamber 42 and is formed with an annular lip portion 64 which extends within the passage 43, tightening of the screws 68 acting to hold the unit 41 in assembly position at the inlet of passage 43, in an obvious manner.

The combination element 59 includes a resistance coil 64 inserted in an insulating tube 66 which in turn is mounted in a copper tubular sleeve 67. The element 59 is in heat conducting relation with the inclined wall 53 and with the copper partition plate 44, the end 61 thereof being formed to partially expose a portion of the resistance wire 64. Ignition is accomplished by the heat projected from the end 61 of the element 59, the degree of ignition heat being determined essentially by the length of the heating element 59.

As previously noted the pressure of the fuel and air entering the mixing chamber 39 is too low to produce any atomization of the fuel for mixing with the air. Mixing of the air and fuel, therefore, is accomplished by vaporizing the fuel in the mixing chamber 39. By virtue of the arrangement of the combination element 59 in the unit 41 it does not operate as a hot spot, as such is usually considered with reference to a heater element or portion, but operates to heat the mixing and equalizing chambers and their surrounding walls so that the variation in the temperature within the chambers and their surrounding walls is about 10° F. The temperature in the mixing and equalizing chambers, however, is at all times less than that which would effect an ignition or burning of the fuel within such chambers.

The chambers 39 and 42 are maintained at a predetermined operating temperature by means of a thermal switch unit 70 which is responsive to the heat from the heating portion of the element 59. The unit 70 is insulatingly mounted on the outside of the inclined wall portion 53 and extends outwardly into the air supply chamber 7, the unit being comprised of bi-metal contact arms 71 and 72 having associated contact arms 73 and 74, respectively. The bi-metal arms 71 and 72 are movable independently of each other and are adapted for movement at different temperatures; bi-metal switch 71—73 being in a normally closed position and arranged in the electrical circuit of the combination element 59, and bi-metal switch 72—74 being normally open and arranged in the electrical circuit of the fuel pump 9. Energization of the element 59 is obtained by its connection with a suitable electrical source such as a battery 75, the circuit from the battery including conductors 76 and 77, arms 72 and 71, and conductor 78; the circuit being completed to ground by connection of the resistance wire 64 to the copper tubing 67 at the heater end 61. The conductor 76 is also common to the circuit of the motor 12 and fuel pump 9, the motor being connected directly to the battery 75 by the conductors 76 and 81; and the circuit for the fuel pump including conductors 76 and 77, arms 74 and 72, conductor 79, breaker assembly 28 and conductor 80.

The operation of the heater is started by closing the main switch 86 which simultaneously closes the circuits for the heating element 59 and fans 8 and 11, the circuit of the fuel pump 9 being opened by the normally open bi-metal switch 72—74. When the heating element 59 reaches a temperature of about 75° F., the bi-metal arm 74 is moved into contact with the arm 72 to close the circuit of the fuel pump 9. A time delay is thus provided between the start of operation of the element 59 and the fuel pump 9 to assure a burning of the fuel admitted into the chamber 39 and to prevent any accumulation of raw fuel in the combustion chamber 6. Since the fans 8 and 11 and pump 9 are all operated by the motor 12, the air and fuel supplied to the mixing chamber 39 through the nozzle 54 and air ports 58 are supplied at corresponding rates to provide for an air and fuel mixture in the chamber 39 of substantially uniform richness ratio. The air and fuel thus admitted into the mixing chamber is impinged against the heated inclined wall 53 and heater element 59, the resultant mixture being forced through the apertures 46 in the partition wall 44 and into the equalizing chamber 42 by the pressure of the air in the supply chamber 7. From the equalizing chamber 42 the mixture passes through the apertures 48 in the ceramic partition 47 into the combustion chamber 6 where it is ignited by the hot end 61 of the combination element 59. The continued operation of the element 59 increases the temperature of the chambers 39 and 42. When this temperature reaches a value of about 200° F., the bi-metal arm 71 moves out of engagement with the contact arm 73 to open the heater element circuit and stop the operation of the heating element; the fans 8 and 11 and fuel pump 9 continuing in operation.

Since the walls of the mixing chamber are at substantially the same temperature as the element 59, the fuel directed from the nozzle 54 against the element 59 and inclined wall 53 is substantially immediately vaporized to provide for its mixing together with the air admitted into the mixing chamber 39. The inclination of the wall 53 deflects the mixture against the heat-conducting partition wall 44 to further vaporize the fuel. As clearly shown in Fig. 1, the apertures 46 are arranged in that portion of the wall above the element 59; the lower portion of the wall being imperforate to form a small reservoir or fuel carrying portion 45 at the bottom of the chamber 39 between the partition wall 44 and the inclined wall 53. Since any free fuel particles in the chamber 39 tend to drop to the bottom of the chamber, they are collected in the reservoir 45 in proximity to the heating element and in a contacting position with the air in the mixing chamber. These particles are thus heated and vaporized so as to mix with the air for passage into the chamber 42 in a vaporous form. Any unmixed fuel is thus retained in the chamber 39 until it is properly conditioned for an efficient burning in the combustion chamber 6.

The mixture admitted to the equalizing chamber 42 is maintained in a vaporized condition by the heat produced therein by the element 59, the chamber 42 acting to distribute the vaporized mixture substantially uniformly over the entire cross-sectional area of the combustion passage 43 to reduce to a minimum the occurrence of any free rich or lean mixture portions in the combustion chamber. If any back-firing should occur during heater operation, the valve 36 will close in response to the increased pressure in the chamber 7 to prevent any of the burned mixture from passing into the passages 17 and 21.

Should the temperature in the mixing chamber 39 fall below about 200° F., the bi-metal arm 71 moves into contact with the contact arm 73 to again energize the heating element 59. When the temperature of the chamber 39 increases to about 200° F., the bi-metal arm 71 breaks away from the contact arm 73 to again open the circuit of the heater element 59. This cyclic action of the bi-metal switch 71—73 continues during the normal operation of the heater, the operation of the heater being stopped by opening the switch 86.

In the event the element 59 fails, for some reason, to become energized on closing of the switch 71—73, air and fuel will continue to be supplied to the chamber 39 until the temperature of the chamber drops to about 75° F., at which time the bi-metal arm 72 will break its contact with the arm 74 to open the fuel pump circuit, thus leaving only the fans 8 and 11 in operation. Raw fuel is thus prevented from accumulating in the combustion chamber 6, the continued operation of the fans serving to sweep or scavenge the chamber 6 of such fuel. Operation of the fans is stopped by opening the switch 86. Since the bi-metal arm 72 is responsive to the heat conditions of the heating element 59, fuel is admitted to the chamber 39 only after the chamber has been raised to a temperature of about 75° F., the fuel supply being stopped when the temperature of the chamber falls below such temperature, so that fuel is supplied to the heater both at the start of and during heater operation only when the heating element is capable of operation.

Since the quantity of air admitted into the heater device is relatively small the mixture in the chamber 39 is normally relatively rich so that it is readily ignited. This rich mixture, however, although readily ignited is not adapted for complete and efficient burning. To provide for the complete burning of the mixture a portion of the air from the air supply chamber 7 is admitted through the apertures 62, previously mentioned, into the combustion chamber 6 after the ignition of the mixture by the end 61 of the heater element 59, which is positioned in the region of rich mixture. The rich mixture from the chamber 42 is thus first ignited and then leaned by the addition of the supplementary air from the ports 62 to provide for its complete burning. The quantity of air admitted through the aperture 62 is controlled directly by the pressure created in the chamber 7 by the fan 8 and, therefore, is in accordance with the richness ratio of the mixture in the chamber 39.

In the normal operation of the heater the common motor 12 for the fans 8 and 11 and fuel pump 9 simultaneously operates these parts to provide for a mixture in the chamber 39 of substantially uniform richness ratio and a movement of the mixture through the combustion chamber 6 at a substantially uniform rate. Movement is imparted to the mixture at the combustion chamber outlet 29 by the suction fan 11 simultaneously with a movement of the mixture at the inlet of the combustion chamber by the pressure produced by the fan 8. The mixture is thus acted upon at both ends of the combustion passage 43 so that a scavenging action of substantially uniform intensity is effected throughout the entire length of the combustion passage 43. If the back pressure in the combustion chamber should tend to increase above a normal operating value, the suction fan 11 is choked in its operation by a reduction in the quantity of mixture available at the passage outlet 29. This choking of the suction fan 11 decreases the capacity of the fan 11, so that its load on the motor 12 is correspondingly decreased. The motor speed thus tends to increase. This increase in speed of the motor 12 not only increases the speed of the fan 11 but also increases the speed of the fan 8 whereby to increase the pressure of the air in the supply chamber 7 and in turn increase the air pressure applied at the inlet of the combustion passage 43. The back pressure in the combustion chamber 6 is thus acted upon by an increase in the suction pressure at the passage outlet 29 and by an increase in the positive pressure at the inlet to the combustion passage 43. The fluid circulating fans 8 and 11, therefore, provide compensating effects, due to the balancing of their loads by the motor 12, to retain the pressure conditions in the chamber 6 substantially constant. The fans 8 and 11 thus cooperate to move the mixture at both ends of the combustion passage 43 to provide for its flow throughout the length of the passage 43 at a substantially uniform rate. Burning of the mixture in the combustion chamber thus proceeds smoothly and efficiently and with a minimum of noise.

Figure 2:
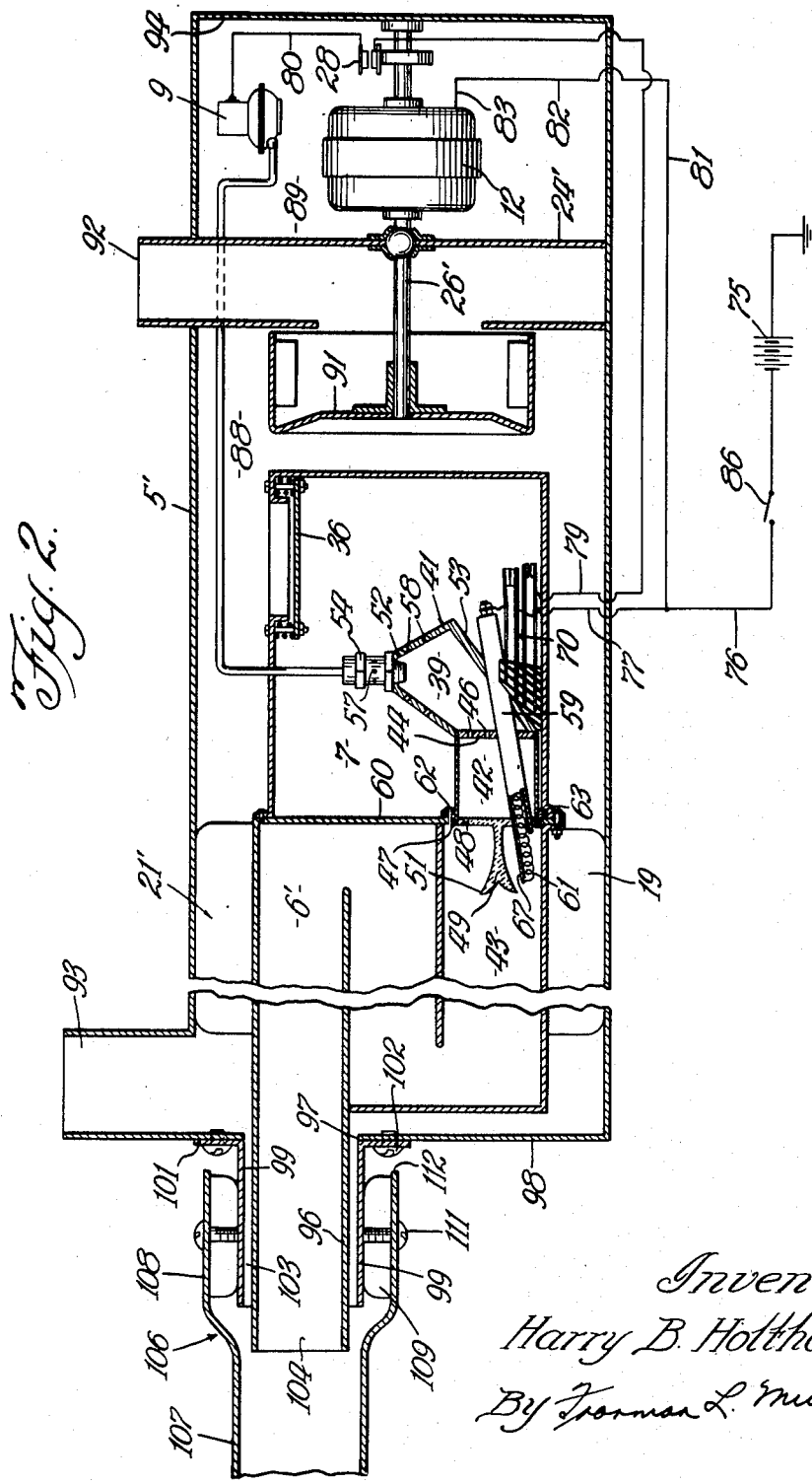
Fig. 2 is a diagrammatic illustration of a modified form of the invention.

Since the modified form of the invention shown in Fig. 2, is similar in many respects to the embodiment of Fig. 1, similar numerals of reference shall be used to designate similar parts. The heater comprises a housing 5' of substantially cylindrical form which has arranged therein a combustion chamber 6', an air supply chamber 7, a fan compartment 88 and a motor compartment 89, the compartments 88 and 89 being separated by a partition wall 24'. The combustion chamber 6' and air supply chamber 7 are assembled in longitudinal alignment and are concentrically spaced from the housing structure 5' by the fins 19 to form an annular passage 21' between the chambers 6' and 7 and the housing structure 5'. A fan 91 is arranged in the fan compartment 88 for drawing air into the heater through an inlet 92 for circulation about the fins 19 in the annular passage 21' and discharge through the outlet 93, the inlet 92 and outlet 93 being suitably connected to provide for a heating of the craft passenger compartment. The fan 91 is mounted at one end of the motor shaft 26' which is rotatably supported in the partition wall 24' and in the end wall 94 of the structure 5'. The motor 12 and fuel pump 9 are located in the motor compartment 89 and are similar in structure and operation to the corresponding parts previously described in connection with Fig. 1. A portion of the air from the fan 91 is supplied to the chamber 7 through valve 36, the fuel conditioning unit 41 located in the chamber 7 being similar in structure and operation to the corresponding unit in Fig. 1, so that a further description thereof is believed to be unnecessary.

The combustion chamber 6' is provided with a projecting end section or conduit 96, which extends through an opening 97 formed in the end wall 98 of the housing 5'. The opening 97 is somewhat larger in diameter than the conduit 96 so that an annular space is formed between the conduit 96 and the peripheral edge of the opening 97. Concentrically disposed about the chamber section 96 and in alignment with the opening 97 is an annular housing or tubing 99 having a flange 101 which is secured to the housing end wall 98 by screws 102. There is thus formed between the chamber section 96 and the housing 99 an annular passage 103 which is in communication with the annular passage 21'. A portion of the air circulated through the passage 21' is thus diverted or by-passed through the passage 103 for discharge from the heater; the air flowing through the passage 103 providing for a suction action at the outlet 104 of the combustion chamber, whereby to reduce the back pressure in the chamber 6'. Movement is thus imparted to the mixture in the combustion passage 43, by the suction action at the outlet 104 and the pressure action at its inlet by the fan 9', so that a substantially uniform rate of flow of the mixture is obtained throughout the entire length thereof.

A further reduction in the back pressure in the combustion chamber 6' is obtained by cooling the mixture at the outlet 104. The cooling means include a tubular sleeve 106 having a reduced section 107 with a diameter substantially equal to that of the housing 99. The enlarged section 108 of the sleeve 106 is concentrically spaced about the housing 99 by means of spacers 109 to form an annular passage between the housing 99 and the enlarged section 108. The sleeve 106 is frictionally secured to the housing 99 by means of screws 111. Since the annular passage 109 is in communication at its end 112 with the atmosphere a flow of recirculated air through the annular passage 103 products a flow of atmospheric air through the annular passage 109, the mixing of the cool atmospheric air with the air from the passage 103 providing for a substantial cooling of the mixture at the outlet 104.

Operation of the heater in Fig. 2 is started by closing the switch 86, the fuel pump 9 and fan 91 being operated simultaneously by the motor 12; the circuits for the motor 12, fuel pump 9 and thermal unit 70 being the same as that described in connection with Fig. 1. A portion of the air supplied by the fan 91 is supplied to the chamber 7 for mixing with the fuel from the pump 9 in the mixing chamber 39, the remaining air being passed through the annular passage 21' for discharge through the annular passage 103 and outlet 93. The amount of air passing through the passage 103 is proportionally small as compared to the air discharged through the outlet 93, so as not to effect to any appreciable degree the quantity of heated air which is supplied to the mobile craft compartment from the outlet 93. Since the pressure in the supply chamber 7 and the suction pressure at the outlet 104 are both the result of operation of the fan 91, these pressures maintain a corresponding operating relation during the normal operation of the heater so that a substantially uniform rate of flow of the mixture through the combustion chamber 6' is maintained at all times. The operation of the heater is stopped by opening the switch 86.

Figure 3:
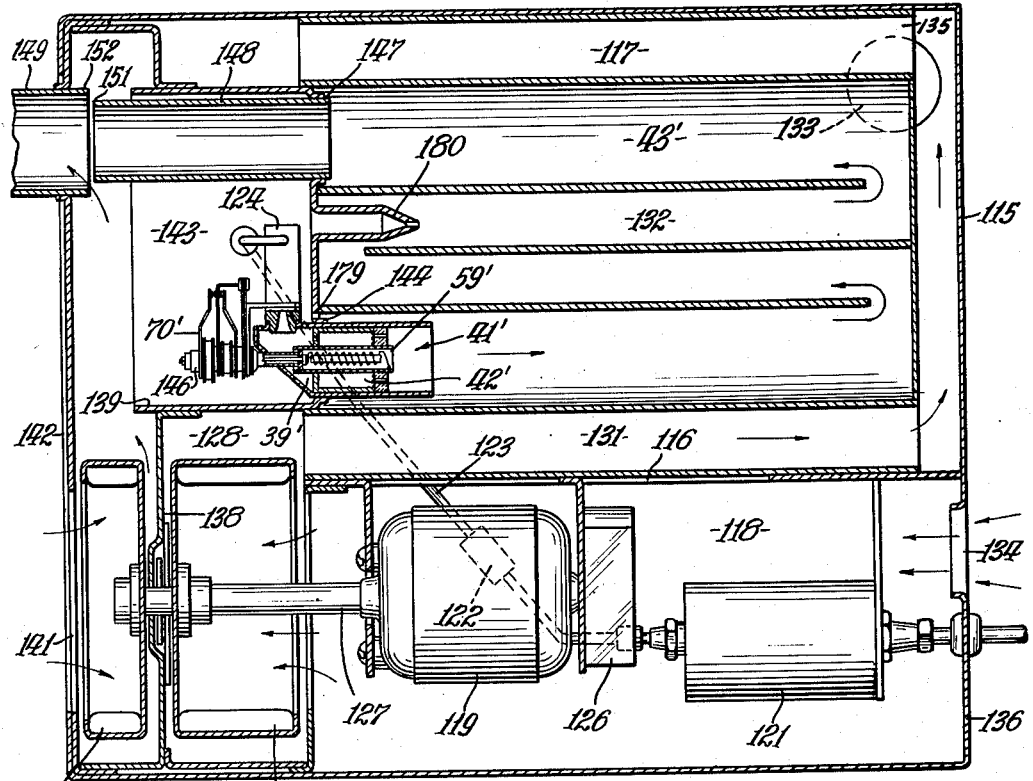
Fig. 3 is a diagrammatic illustration of yet another form of the invention.

With reference to the modification shown in Fig. 3 the heater is illustrated as being completely enclosed by a housing member 115 which is divided substantially over its entire longitudinal length by a frame member 116 into a combustion compartment 117 and a mechanical compartment 118. Arranged within the mechanical compartment 118 are a motor 119, a fuel pump 121, and a fuel metering device 122 arranged in a fuel line 123 connecting the pump with a fuel nozzle 124. The fuel pump 121 is illustrated as being of solenoid type and is controlled in its operation by a breaker indicated at 126 and operated from the shaft 127 of the motor 119. Compartment 118 is in communication with a fan chamber 128 for an air-circulating fan 129 which is operated by the motor 119 and is mounted on the shaft 127 thereof. The combustion chamber 132 is generally similar to the combustion chambers illustrated in Figs. 1 and 2 and includes heat radiating fins 135. The fan 129 functions to circulate air through passages 131 formed about the combustion chamber 132 and to discharge such circulated air through an outlet 133 which may be suitably connected with the passenger compartment (not shown) of a mobile craft. Air for the fan 129 is supplied through an inlet 134 formed in the end 136 of the housing member 115 and opening into the mechanical compartment 118. This inlet is also suitably connected with the passenger compartment of the mobile craft so that the recirculated air from the passenger compartment is first drawn through the length of the compartment 118 prior to being heated by its travel through the passages 131. All of the operating devices of the compartment 118 are thus continuously cooled by the recirculated air from the passenger compartment during the normal operation of the heater. It is to be understood, of course, that the inlet 134 may be open to the atmosphere so as to provide for the passage into the craft compartment of heated fresh or outside air, or a mixture of fresh and recirculated air.

The motor 119 is also common to an air supply fan 137 which is mounted on the motor shaft 127 adjacent the fan 129 but separated therefrom by a sealing or partition plate 138. As is clearly indicated in Fig. 3 the plate 138 in conjunction with a substantially cup-shaped end cover member 139 serves to completely seal the fan 129 and the passages 131 from the air supply fan 137. The fan 137 draws fresh air through an inlet 141 formed in the end 142 of the housing 115, and delivers this air into an air supply chamber 143 arranged at the left end of the combustion chamber 132 as viewed in Fig. 3. The air from the chamber 143 is mixed with the fuel from the fuel nozzle 124 mounted in a fuel conditioning unit 41' which is located in the chamber 143 at the inlet 144 of the combustion chamber. The unit 41' is substantially similar to the unit 41 previously described in connection with Fig. 1 and is comprised of an air and fuel mixing chamber 39', an equalizing chamber 42', and a combination heating and igniting element 59', the thermostatic switch unit 70' for controlling the operation of the conditioning unit being mounted directly on a portion 146 of the element 59' which extends outwardly from the conditioning unit 41' and within the air supply chamber 143.

The outlet 147 of the combustion passage 43' is provided with an extension 148 which extends within the air supply chamber 143 and is spaced from the end wall 142 of the housing 115. A second extension 149 of greater diameter than the extension 148 is arranged in the end wall 142 in coaxial alignment with the extension 148 but axially spaced a small distance therefrom. As is clearly evident in Fig. 3, the adjacent ends 151 and 152 of the extension members 148 and 149, respectively, are positioned within the air supply chamber 143 and in fluid communication therewith.

Figure 4:
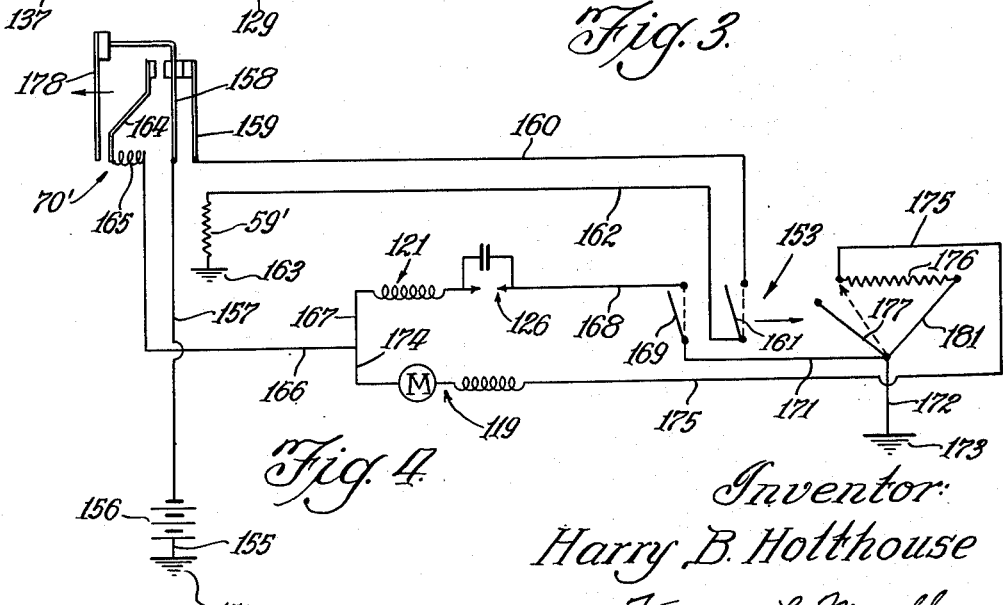
Fig. 4 is a control circuit for the heating device in Fig. 3.

In the operation of the heater of Fig. 3, and with reference to the control circuit therefor, shown in Fig. 4, moving of the main switch 153 in the direction indicated by the arrow from a full line position to a dotted line position, closes the circuit for the combination element 59'. This circuit from the ground 154 includes conductor 155, a battery 156, conductor 157, a double contact arm 158 and a single contact arm 159 in the thermostatic switch unit 70', conductor 160, pole 161 of the main switch 153, conductor 162, the combination element 59', and ground 163, the arms 158 and 159 being normally closed. A circuit for the pump 121 from the ground 154 is comprised of conductor 155, battery 156, conductor 157, contact arm 158, contact arm 164 in the thermostatic switch unit 70', induction coil 165, conductors 166 and 167, pump 121, breaker assembly 126, conductor 168, pole 169 of the switch 153, conductors 171 and 172, and ground 173. The motor circuit from the ground 154 is common with the pump circuit through conductor 166 and includes further conductor 174, the motor 119, conductor 175, rheostat or resistance 176, a conductor rheostat control arm 177, conductor 172, and ground 173. Since the contact arms 158 and 164 are normally open it is evident that only the circuit for the combination element 59' is energized when the switch 153 is initially closed.

As the element 59' becomes heated to a temperature of about 150° F., the bi-metal arm 178 of the thermostatic switch unit 70' moves to the left, or in the direction indicated by the arrow in Fig. 4, to permit arm 158 to move in contact with the arm 164. The induction coil 165 immediately on closing of the arms 158 and 164 is arranged to provide for a magnetic attraction between the arms 158 and 164 to eliminate any fluttering action therebetween. This closing of the arms 158 and 164 in turn closes the circuits for the motor 119 and pump 121 so that the element 59', motor 119 and pump 121 are all in operation. When the element 59' becomes heated to a temperature of about 200° F., the arm 158 moves out of contact with the arm 159 to open the element circuit, the motor and pump continuing in operation to supply air and fuel to the vaporizing unit 41' for conditioning in the manner above fully described in connection with Fig. 1. As previously mentioned the air and fuel mixture leaving the fuel conditioning unit is initially rich so as to make it easily ignitable. However, to promote an efficient burning thereof this mixture is initially leaned by the admission of air from the air supply chamber 143 to the inlet 144 of the combustion passage 43' through apertures 179 arranged about the conditioning unit 41' at the inlet 144. Additional air for leaning the combustible mixture is admitted into the combustion passage 43' substantially intermediate the inlet 144 and outlet 147 thereof, through an air duct 180 in fluid communication with the air supply chamber 143 and extending within the passage 43' in a manner such that the air therefrom is directed in the direction of flow of the combustible mixture through the passage 43'.

On decrease of the temperature of the combination element 59' to about 150° F., the bi-metal arm 178 moves to the right, as viewed in Fig. 4, an amount sufficient to close the element circuit, this circuit being opened when the temperature of the element 59' again reaches a temperature of about 200° F. It is evident, therefore, that the pump, motor, and element circuits are all closed over a temperature range of about 50° F., namely, between about 150° F. and 200° F., with the pump and motor only continuing in operation when the temperature of the element 59' is above about 200° F. The conditioning unit during normal heater operation is thus always retained by the thermostatic unit 70' at a temperature which vaporizes the fuel for a thorough mixing with the air.

The main control switch 153 is constructed so that the poles 161 and 169, thereof, remain closed when the switch control button (not shown) is manipulated to operate the rheostat control arm 177 to regulate the speed of the motor 119. Since the motor is common to the air supply fan 137, and pump 126, the relative proportions of air and fuel admitted to the fuel conditioning unit 41' are automatically controlled throughout the speed range of the motor.

On opening of the main switch 153 to stop the operation of the heater, the circuits for the pump 126 and combination element 59' are immediately opened by the opening of the switch poles 161 and 169 of the control switch 153. The circuit for the motor 119, however, remains closed through the thermostatic switch unit 70' by virtue of the bi-metal arm 178 being at a temperature which retains the arms 158 and 164 closed, and through a shunt conductor 181 connecting the rheostat 176 with conductor 172 and ground 173. The motor and hence the fans 137 and 129 thus continue in operation until the bi-metal arm 178 is cooled below a temperature of about 150° F. Any excess fuel is thus completely scavenged from the combustion passage 43' by this delayed operation of the motor so that the passage is free of any possible fuel accumulations on later operation of the heater.

During the normal operation of the heater of Fig. 3 the air supply chamber 143 is maintained under pressure by the action of the supply fan 137. Since the combustion passage 43 at its inlet 144 is in fluid communication with the chamber 143 through the unit 41', and air passages 179, this pressure serves to force or initiate movement of the combustible mixture through the passage 43'. Because of the relatively low air pressure available, it is evident that any occurrence of a back pressure in the passage 43' would impair a continuous flow of the mixture at a substantially uniform rate through this passage, to in turn impair an even and steady burning of the combustible mixture in the passage. In order to eliminate these back pressures and to maintain a continuous even flow of the mixture through the passage 43', means including the extensions 148 and 149, previously mentioned, are provided at the passage outlet 147 to produce a suction effect at such outlet. With the adjacent ends 151 and 152 of the extensions in a spaced relation and open to the chamber 143 a portion of the air from the chamber 143 flows outwardly through the extension 149, this air flow producing an area of reduced pressure in the extension 148 which acts to effect a pulling or drawing action on the mixture at the outlet 147. It is seen, therefore, that the mixture in the passage 43' is simultaneously pushed and pulled through the combustion passage 43', with the force of the pushing and pulling actions being directly responsive to the speed of the air supply fan 137, and hence to the speed of the motor 119. By virtue of this construction critical back pressures in the combustion passage 43' are practically eliminated and a steady flow of the mixture is maintained throughout the length of the combustion passage 43' at all times of heater operation.

The invention is thus seen to provide for a heater of internal combustion type for a mobile craft which is operated independently of the craft engine and entirely by the power of the usual battery for such engine. The heater is of rugged and simple construction and substantially noiseless in operation. The provision for a suction action at the outlet of the combustion chamber and a positive pressure at the inlet thereof provides for a smooth uniform flow of the combustible mixture throughout the entire length of the combustion chamber, the initiation of movement of the mixture at each end of the combustion chamber providing for a positive scavenging action and a substantial elimination of critical back pressures. The invention provides further for a heater in which the air and fuel supply means and the suction and force pressure means are operated by a common motive power to provide for a simultaneous relational operation thereof, so that the rate at which air and fuel is fed to the combustion chamber is substantially constant and in correspondence with the rate of flow of the mixture through the combustion chamber to in all provide for an even and steady burning of the mixture in the combustion chamber.

It is to be understood that the relative temperatures used in the above description are representative of one fuel used in the operation of the heater and that these values will vary for different fuels. It is to be understood also that only preferred embodiments of the present invention have been illustrated and described herein and that alterations and modifications thereof can be made which are within the full intended scope of the invention as defined by the appended claims.

I claim:

1. In a heating device of internal combustion type having a combustion chamber with an inlet and an outlet, said inlet being at one end of said combustion chamber, means defining an air space at said one end of said combustion chamber, fuel vaporizing means positioned in said air space at said inlet, means supplying fuel to said vaporizing means, means admitting air from said air space into said vaporizing means for mixing together with said fuel, means supplying air to said air space and retaining the air in said space at a substantially constant pressure, whereby said pressure is utilized to push the air and fuel mixture from said vaporizing means into said combustion chamber, and means providing for the flow of said mixture through said combustion chamber at a substantially uniform rate including a conduit extended into said air space in axial alignment with said outlet but spaced from said outlet to permit air from said air space to pass therethrough, whereby the passage of said air through said conduit creates a suction pressure at said outlet to produce a pulling action on the mixture at said outlet.

2. In internal combustion heating apparatus which includes a walled structure defining an air pressure chamber and a combustion chamber having fuel inlet and exhaust openings therebetween, a fuel and air mixing unit positioned in said air pressure chamber at said inlet and provided with ports through which air from said pressure chamber is admitted to said unit for mixing with fuel and for transmission to said combustion chamber, means for delivering air to said air pressure chamber to produce air pressure therein, and means for delivering fuel to said mixing unit, said structure having an exhaust passage for exhausting air from said pressure chamber at a point opposite said exhaust opening, thereby to create a suction at said exhaust opening.

3. In internal combustion heating apparatus which includes a walled structure defining an air pressure chamber and a combustion chamber having fuel inlet and exhaust openings therebetween, a fuel and air mixing unit positioned in said pressure chamber at said inlet and provided with ports through which air from said pressure chamber is admitted to said unit for mixing with fuel and for transmission to said combustion chamber, means for delivering air to said air chamber to produce air pressure therein, means for delivering fuel to said mixing unit, and a pair of axially aligned tubular members extending into said pressure chamber and communicating with said pressure chamber, one of said members communicating with said combustion chamber through said exhaust opening and forming with said other member an orifice whereby air from said pressure chamber may be exhausted through the orifice between said members to create a suction at said exhaust opening.

4. Gasoline burning internal combustion heating apparatus having relatively low voltage direct current operated electrical means therein, said heating apparatus being adapted to be installed in a vehicle of the highway type for heating the passenger compartment thereof and deriving all the power required for operation of the electrical means therefor from the vehicle battery, and said apparatus including in combination a small walled housing and operating structure mounted within said small walled housing, said housing and the operating structure therein being compactly arranged and of such size as to permit convenient mounting of the same as a self-contained unit in a limited space in the vehicle, said operating structure comprising in combination walled means forming a combustion and exhaust chamber having an air inlet and an outlet therefrom with said walled means positioned relative to the housing interior such that a passage for air to be heated is provided about said chamber and within said walled housing, heat exchange means extending outwardly from a substantial portion of the entire walled means, means for circulating air to be heated through said passage and about said heat exchange means, fuel igniting means and means for feeding vaporized gasoline operatively connected with said chamber at the combustion end and air inlet thereof, means defining an air supply chamber at said air inlet in said combustion and exhaust chamber to provide low pressure combustion air therefor, means for creating a suction at said outlet in said combustion and exhaust chamber and expelling gases exteriorly of the housing, and said electrical means including a relatively low voltage motor having aligned shafting connected directly thereto and directly to both said air circulating means and said suction-creating means, whereby the motor is capable of simultaneously circulating sufficient air to be heated and creating a suction in the combustion and exhaust chamber.

5. Internal combustion heating apparatus as specified in claim 4 in which said air circulating means and said suction creating means are connected to the ends of said shafting and said motor is connected to said shafting intermediate the ends thereof.

6. Internal combustion heating apparatus as specified in claim 4 in which said combustion and exhaust chamber is of longitudinal configuration and said shafting extends parallel to the longitudinal axis thereof.

7. Gasoline burning internal combustion heating apparatus having relatively low voltage direct current operated electrical means therein, said heating apparatus being adapted to be installed in a vehicle of the highway type for heating the passenger compartment thereof and deriving all the power required for operation of the electrical means therefor from the vehicle battery, and said apparatus including in combination a small walled housing and operating structure mounted within said small walled housing, said housing and the operating structure therein being compactly arranged and of such size as to permit convenient mounting of the same as a self-contained unit in a limited space in the vehicle, said operating structure comprising in combination walled means forming a combustion and exhaust chamber having an air inlet and an outlet therefrom with said walled means positioned relative to the housing interior such that a passage for air to be heated is provided about said chamber and within said walled housing, heat exchange means extending outwardly from a substantial portion of the entire walled means, a fan for circulating air to be heated through said passage, fuel igniting means and means for feeding vaporized gasoline operatively connected with said chamber at the combustion end and air inlet thereof, means defining an air supply chamber at said air inlet to provide low pressure combustion air therefor, a fan positioned at said outlet for creating a suction in said combustion and exhaust chamber and expelling gases exteriorly of the housing, and said electrical means including a relatively low voltage motor having aligned shafting connected directly thereto and directly to both said air circulating fan and said suction-creating fan, whereby the motor is capable of simultaneously circulating sufficient air to be heated and creating a suction in the combustion and exhust chamber.

8. Gasoline burning internal combustion heating apparatus having relatively low voltage direct current operated electrical means therein, said heating apparatus being adapted to be installed in a vehicle of the highway type for heating the passenger compartment thereof and deriving all the power required for operation of the electrical means therefor from the vehicle battery, and said apparatus including in combination a small walled housing and operating structure mounted within said small walled housing, said housing and the operating structure therein being compactly arranged and of such size as to permit convenient mounting of the same as a self-contained unit in a limited space in the vehicle, said operating structure comprising in combination walled means forming a combustion and exhaust chamber having an air inlet and an outlet therefrom with said walled means positioned relative to the housing interior such that a passage for air to be heated is provided about said chamber and within said walled housing, heat exchange means extending outwardly from a substantial portion of the entire walled means into said passage, means for circulating air to be heated through said passage, fuel igniting means and means for feeding vaporized gasoline operatively connected with said chamber at the air inlet thereof, means defining an air supply chamber at said air inlet to provide low pressure combustion air therefor, means for creating a suction at said outlet in said combustion and exhaust chamber and expelling gases exteriorly of the housing, said supply of combustion air and exhaust of gases from combustion being entirely independent of said air heating passage, and said electrical means including a relatively low voltage motor having aligned shafting connected directly thereto and directly to both said air circulating means and said suction-creating means, whereby the motor is capable of simultaneously circulating sufficient air to be heated and creating a suction in the combustion and exhaust chamber.

HARRY B. HOLTHOUSE.

REFERENCES CITED

The following references are of record in the file of this patent:

UNITED STATES PATENTS

| Number | Name | Date |
| --- | --- | --- |
| 1,333,229 | Toles | Mar. 9, 1920 |
| 2,074,168 | Danuser et al. | Mar. 16, 1937 |
| 2,031,335 | Solyan | Feb. 18, 1936 |
| 2,191,178 | McCollum | Feb. 20, 1940 |
| 2,207,776 | Black | July 16, 1940 |
| 1,629,921 | Mansfield | May 24, 1927 |
| 1,424,567 | Higgins | Aug. 1, 1922 |
| 2,106,414 | Price | Jan. 25, 1938 |
| 1,777,732 | Pearson | Oct. 7, 1930 |
| 2,213,656 | Pinkerton et al. | Sept. 3, 1940 |
| 1,658,198 | Hosch | Feb. 7, 1928 |
| 2,172,667 | Nelson | Sept. 12, 1939 |
| 2,188,133 | Hepburn | Jan. 23, 1940 |
| 1,547,156 | Loepsinger | July 21, 1925 |
| 1,869,939 | Latimer | Aug. 2, 1932 |
| 2,314,089 | Hess et al. | Mar. 16, 1943 |
| 1,676,501 | Moors | July 10, 1928 |
| 2,059,523 | Hepburn | Nov. 3, 1936 |
| 2,141,873 | Modine | Dec. 27, 1938 |

FOREIGN PATENTS

| Number | Country | Date |
| --- | --- | --- |
| 39,895 | Netherlands | Jan. 1, 1937 |
| 166,145 | Switzerland | Feb. 16, 1934 |